United States Patent
Moore

(10) Patent No.: US 7,130,865 B2
(45) Date of Patent: Oct. 31, 2006

(54) METHODS AND SYSTEMS FOR DEVELOPING MARKET INTELLIGENCE

(75) Inventor: Raymond Moore, Littleton, CO (US)

(73) Assignee: First Data Corporation, Greenwood Village, CO (US)

( * ) Notice: Subject to any disclaimer, the term of this patent is extended or adjusted under 35 U.S.C. 154(b) by 416 days.

(21) Appl. No.: 10/028,471

(22) Filed: Dec. 19, 2001

(65) Prior Publication Data

US 2003/0115216 A1    Jun. 19, 2003

(51) Int. Cl.
G06F 17/30    (2006.01)
(52) U.S. Cl. .......................... 707/104.1; 707/1; 707/10
(58) Field of Classification Search ............ 707/1–100, 707/101, 104.1; 705/1, 14, 26, 35
See application file for complete search history.

(56) References Cited

U.S. PATENT DOCUMENTS

| | | | |
|---|---|---|---|
| 5,491,629 A * | 2/1996 | Fox et al. ...................... | 702/3 |
| 6,148,260 A * | 11/2000 | Musk et al. ................. | 701/200 |
| 6,189,003 B1 * | 2/2001 | Leal .............................. | 707/2 |
| 6,208,998 B1 * | 3/2001 | Marcus ..................... | 707/104.1 |
| 6,298,328 B1 | 10/2001 | Healy et al. | |
| 6,571,279 B1 * | 5/2003 | Herz et al. ................... | 709/217 |
| 2002/0161647 A1 * | 10/2002 | Gailey et al. ................. | 705/14 |
| 2002/0165756 A1 * | 11/2002 | Tobin et al. ................... | 705/10 |
| 2003/0023466 A1 * | 1/2003 | Harper .......................... | 705/7 |
| 2003/0078788 A1 * | 4/2003 | Sussman et al. ............... | 705/1 |

OTHER PUBLICATIONS

U.S. Appl. No. 60/286,916, filed Apr. 27, 2001.*
CACI's FiledForce Planning services and territory optimization software- "CACI Information Solutions"—Published Summer 2001 in Marketing Solutions Today and retrieved from <URL:http://www.caci.co.uk/pdfs/mst_Summer_2001.pdf>.*
"CACI Limited Home Page" -dated Jun. 2001 and retrieved from <URL:http://web.archive.org/web/20010610010807/www.caci.co.uk>.*
Olivier Ertz, Daniel Rappo, Stephane Joost. "Towards Geoservices Portals MEDIAMAPS:WGIS Trends for Business Applications," wise, vol. 02, No. 2, p. 0102, Second 2001.□□<URL:http://doi.ieeecomputersociety.org/10.1109/WISE.2001.996718>.*
MacDonald et al. GIS in Banking: Evaluation of Canadian Banking Mergers. Canadian Journal of Regional Science. vol. XXIV: 3. Autumn, 2001.*
Search Me. Dogile.com results for Articles from Canadian Journal of Regional Science, Spet. 2001 (retrieved Jan. 25, 2006).*

* cited by examiner

Primary Examiner—Jeffrey Gaffin
Assistant Examiner—Neveen Abel-Jalil
(74) Attorney, Agent, or Firm—Townsend and Townsend and Crew LLP

(57) ABSTRACT

Methods and systems are provided for characterizing market distribution for a business having multiple business representatives. The business is considered to be in competition with one or more competitors, each of which also has multiple representatives. Locations are determined both for the business representatives and for the competitor representatives, and these locations are used to populate one or more databases. A locator identification is assigned to each distinct location and used as a pointer within the databases. The locator identification may be unique to specific street addresses, permitting improved analysis of the market information, particularly analysis derived from the geographical distributions of the business representatives and of the competitor representatives.

29 Claims, 5 Drawing Sheets

METHODS AND SYSTEMS FOR DEVELOPING MARKET INTELLIGENCE

BACKGROUND OF THE INVENTION

This application relates generally to the field of market analysis. More specifically, the application relates to methods and systems for developing market intelligence for businesses having multiple representative locations.

Companies and organizations that provide goods and/or services continually seek to achieve a competitive advantage for their products in the marketplace. It has long been recognized that one way in which such a competitive advantage may be achieved is through a superior understanding of the dynamics of the marketplace. Such market intelligence may be used by a business to understand the level and scope of demand for its products, as well as the distribution of its representatives and of its competitors' representatives in seeking to exploit that demand. One common method of developing market intelligence uses a painstaking application of survey techniques, sometimes coupled with more sophisticated demographic modeling.

Such survey tools are successful for certain types of organizations, but are generally not well suited for other types of organizations. For example, in some industries the number of representatives that a given business employs is large and geographically disperse, as is the number of representatives employed by each of its competitors. Indeed, such geographical dispersion is in some instances a significant component of the product supplied by the business. One example is provided by the courier industry, in which each courier provider has a large number of representative locations distributed over a large geographic area. Moreover, the service levels provided by the representative locations may be widely different, with a small number of full-service representatives and a larger number of limited-service representatives. In such an instance, survey tools fail easily to provide information regarding the distribution of competitor locations and to correlate that information with demand for the service.

Other examples of industries for which such information is not readily available include financial-services industries, which may be provided at diverse types of locations and establishments. The money-order industry provides a useful example since a consumer who wishes to purchase a money order has a wide spectrum of options: she may use a bank or other financial institution, may use a money-order service at a convenience store, or may use a postal money-order service, among other options. A competitive advantage would result to an organization that had a better understanding not only of how its representative locations are distributed but also how its competitor's representative locations are distributed. Such information would permit the organization to determine whether a given geographical area had been saturated so that its own representatives were cannibalizing business from other of its representatives, or to determine that the area is underserved so that it would be beneficial to add another representative.

BRIEF SUMMARY OF THE INVENTION

Embodiments of the invention thus include a method for characterizing market distribution for a business having a plurality of business representatives. The business is considered to be in competition with one or more competitors, each of which has a plurality of competitor representatives. Locations are determined both for the business representatives and for the competitor representatives, and these locations are used to populate one or more databases. A locator identification is assigned to each distinct location and used as a pointer within the databases. The locator identification may be unique to specific street addresses, permitting improved analysis of the market information, particularly analysis derived from the geographical distributions of the business representatives and of the competitor representatives.

The locations for the competitor representatives are determined from publicly available information. In one embodiment, an representative-locator service is accessed on an internet web site for each of the competitors to determine the location for each of that competitor's representatives. The representative-locator services may be accessed automatically by a web robot. In another embodiment suitable where the products of interest comprise transactions, the transaction information is parsed to determine the locations for the competitor representatives. Some types of transactions require recording with government agencies; in such cases, government record may be used as the publicly available source of transaction information.

Various methods for deriving market intelligence from the business-representative and competitor-representative databases are within the scope of the invention. In one embodiment, the level of competition is quantified with a distance measure derived from the locations, such as by examining a predetermined radius around each business-representative location for the presence of a competitor representative. In other embodiments, the database location information is correlated with demographic data, such as may be obtained from a census. For geographic divisions within the demographic data, a filter criterion may be applied to the correlated data to characterize the geographic divisions. Such a filter criterion may take the form, for example, of using the demographic data to determine the number of individuals who meet a predetermined profile expected to be representative of the desired customer base. A graphical display, such as using a map, may be used to present the results of such analyses. The graphical display may include product information corresponding to each of the locations.

The methods of the present invention may be embodied in a computer-readable storage medium having a computer-readable program embodied therein for directing operation of a computer system. Such a computer system may include a communications system, a processor, and a storage device. The computer-readable program includes instructions for operating the computer system to characterize market distribution for a business in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention include methods and systems for developing market intelligence. In the following description, a business structure is considered in which a business comprises a plurality of representatives situated at different geographical locations, with the business's products being supplied by each of the representatives. In some instances the representatives may provide different levels of service, while in other embodiments the service level is substantially uniform among representatives. A similar business structure is considered for the competitors, each such competitor comprising a plurality of representatives distributed geographically and perhaps providing the same or different levels of surface.

In one embodiment, the business is one of a plurality of parallel businesses comprised by an umbrella organization. In the event that another of the parallel businesses also has a structure that uses a plurality of geographically distributed representatives, there may or may not be commonality between the set of representatives associated with each of the businesses. For example, in one embodiment in which market intelligence is to be developed for sales of money orders, the organization may be a postal service. One of this organization's businesses is the sale of money orders, that service being provided at a plurality of post-office locations. Other businesses of the postal service may include postage sales, retail sales of packaging materials, etc., each of which may also be performed at a plurality of post-office locations. Each post office may or may not participate in all businesses of the postal service in different embodiments.

Figure 1:
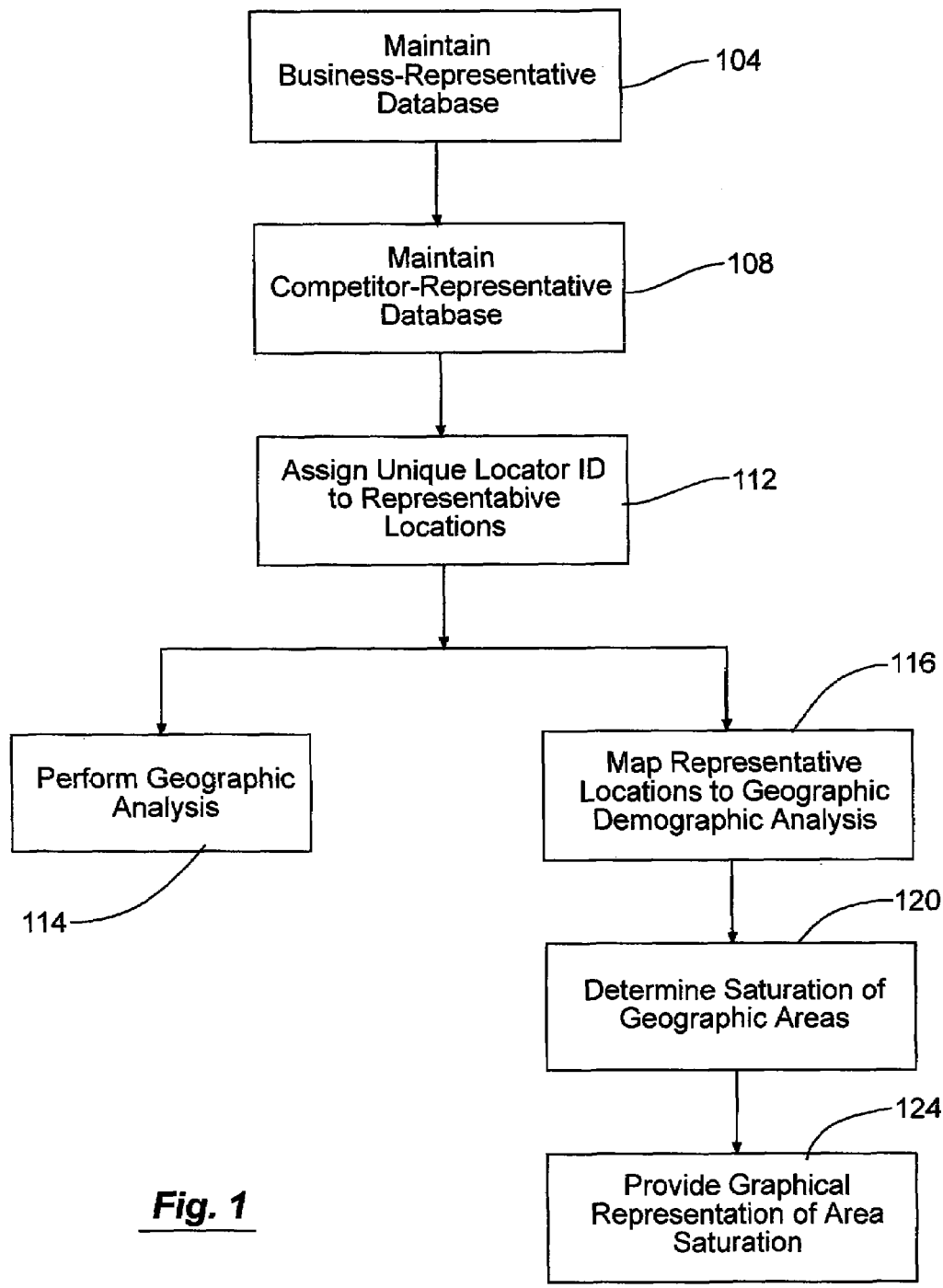
FIG. 1 is a flow diagram providing an overview of one embodiment of the invention.

A general overview of one embodiment of the invention is illustrated with the flow diagram shown in FIG. 1. At blocks 104 and 108, business-representative and competitor-representative databases are respectively maintained. Such databases may be maintained individually or collectively and in one embodiment both comprise relational databases. Generally, a relational database comprises a collection of data structured according to fields that may be related across different portions of the data structure with pointers. The business-representative database maintained at block 104 includes data that are derived from the activities of the business and may therefore include confidential information. In one embodiment, the business-representative database minimally includes an identification and a location for each representative comprised by the business. The business-representative database may also include publicly available information, such as a specification of products and services provided at each location. Examples of confidential information that may also be provided in other embodiments include, for each representative, transaction volume information, a profitability measure, etc. The competitor-representative database(s) maintained at block 108 generally include information that may be derived from publicly available sources. In one embodiment, the competitor-representative database(s) minimally include an identification and a location for each representative comprised by the respective competitors. It may also include information, such as a specification of products and services provided at each location. In other embodiments, other database structures may alternatively be used; in one embodiment, for example, an object-oriented database is used.

Figure 2:
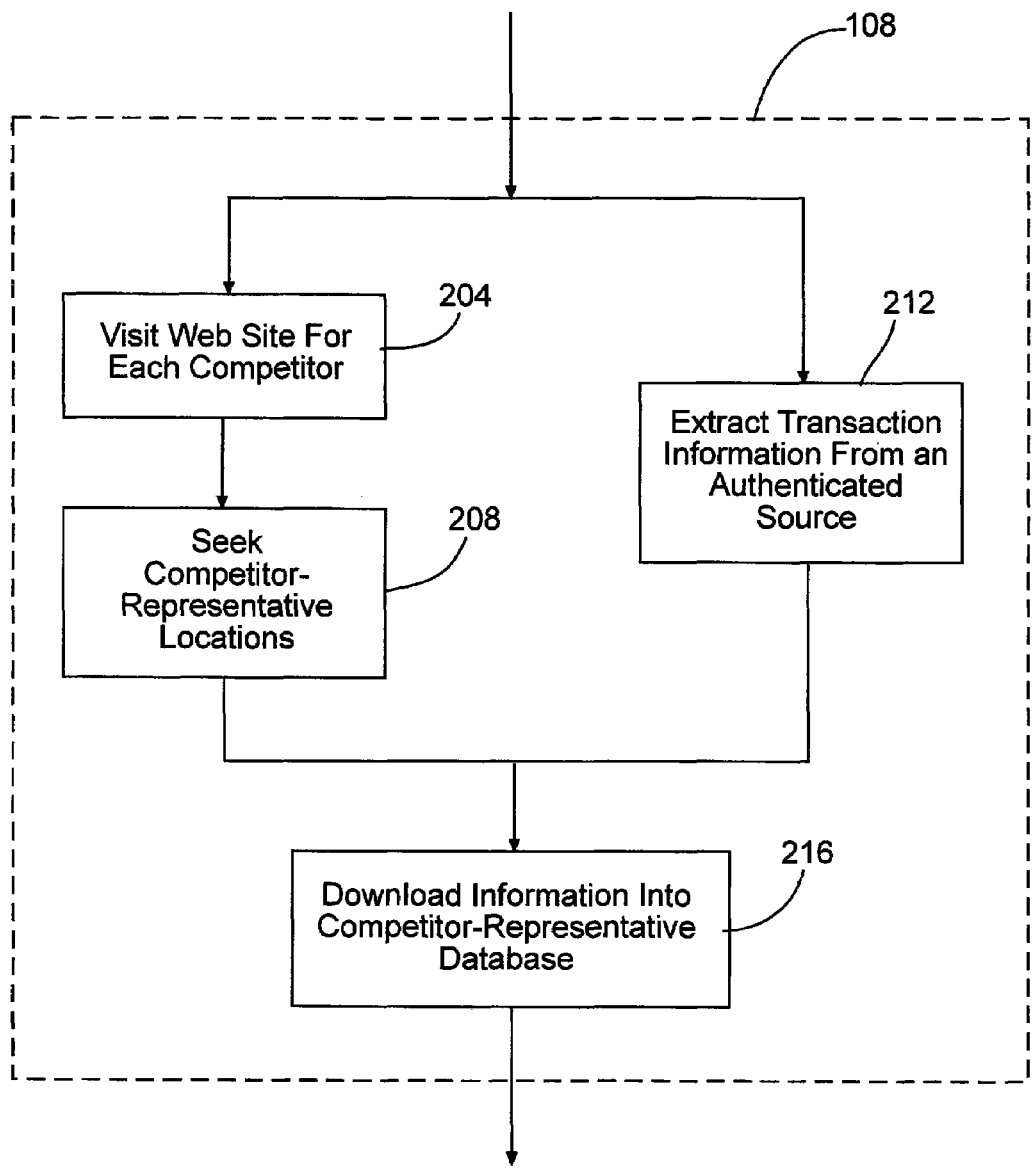
FIG. 2 is a flow diagram illustrating different embodiments for maintaining a competitor-representative database.

An illustration is provided in FIG. 2 for different ways of collecting data used to compile the competitor-representative database at block 108 in different embodiments. The left and right sides of the figure illustrate different methods that may be used for different types of business products. The left side is suitable for businesses in which representative locations are commonly listed on internet web sites. Examples of such businesses include courier-service providers and money-order providers, among others. Because these businesses rely on having relatively large numbers of locations to provide convenient access to customers, they commonly include an "Representative Locator" service on their web sites. Such Representative Locator services typically function by prompting a customer visiting the web site to enter information characterizing a location, such as address, city, state/province, country, postal code, etc., and then providing a list of representatives proximate that location. The information regarding each representative identified typically includes the address of the representative and may include supplementary information, such as the types of products and/or services provided by that representative and hours of operation.

A competitor's Representative Locator service may be used to identify the locations for all of that competitor's representative locations. Thus, at block 204, each competitor's web site is visited and at block 208 competitor-representative locations are extracted from the web site. Such a process may be automated by programming a web robot to visit each competitor site periodically and to extract representative-location information from the Representative Locator service systematically. In instances where information supplementary to the representative location is provided, such as the types of products and/or services provided and the hours of operation, such information may additionally be extracted. After such information has been extracted, it is downloaded into the competitor-representative database at block 216.

The right side of FIG. 2 illustrates a suitable method for compiling the competitor-representative database where relevant information is available from an authenticated source. In one embodiment, the authenticated source comprises publicly available government records. For example, records of money transfers made from the United States are recorded by government agencies and certain information regarding the transfers may be obtained. In some instances, such records include an indication of the origin and destination of the transfer, as well as an indication of the size of the transfer. Thus, in the specific embodiment where the product comprises a money transfer, these available records may be extracted at block 212 and used to populate the competitor-representative database at block 216. Other embodiments that use products in which in which information identifying competitor-representative locations is available may extract that information from any publicly available source.

Referring again to FIG. 1, once business-representative and competitor-representative databases have been populated with location information, that information may be used at block 112 to assign a locator identification to each representative. In one embodiment, such a locator identification is derived from the full street address for the representative location (sometimes referred to herein as a "rooftop locator"). This embodiment has the advantage that the locator identification is uniquely associated with a geographical location. In another embodiment, a postal code is used to derive the locator identification. An example of such a postal code is provided by the Zone Improvement Plan ("ZIP") codes defined in the United States by the United States Postal Service. While a nine-digit version of the ZIP code discriminates geographical locations within the United States relatively finely, the system as currently implemented does not guarantee that every nine-digit ZIP code corresponds to a unique address. Accordingly, the rooftop locator is generally more precise than the ZIP-code locator. In still other embodiments, a different source of data is used to assign the locator identification to each of the representatives.

Irrespective of how the locator identification is derived, it is used as a pointer within the relational database structure to identify specific representatives according to their geographical locations. Thus, this information by itself is sufficient to perform a geographical analysis of the representative-location data at block 114. In one embodiment, such a geographic analysis is performed by plotting both the individual business-representative and competitor-representative locations on a single map. This provides a graphical representation that illustrates penetration of the business in specific geographical areas and compares that with penetration in the same areas by competitors. The map may appear similar to FIG. 3, discussed in greater detail below, with an "x" used to denote the location of a business representative and another symbol used to denote the location of a competitor representative.

In another embodiment, the geographic analysis is quantified by comparing locations of business representatives and competitive representatives. For example, within a given geographic region, the level of competition may be quantified in terms of the probability that a competitive representative exists within a predetermined distance of each business representative. One suitable distance measure is 0.5 miles, in which case circular areas having a radius of 0.5 miles are examined around each business representative to determine whether a competitive representative is located within the area. Other distance measures, such as 0.25 miles or 1.0 miles, may alternatively be used, depending for example on the overall population density within the geographic region. Furthermore, the distance measures may further exploit the database structures by limiting comparisons to certain service levels in those instances where different representatives may provide different service levels. As used herein, "service level" is intended to be broadly inclusive, referring at least to the types of products that ages provide or to the hours of operation they provide.

This probability measure is indicative of the level of competition faced by the business representatives. Alternative distance-measure definitions may also be used to derive such probability measures. For example, the level of competition provided by the business representatives may be quantified with the probability that a business representative exists within a predetermined distance of each competitive representative. As a further example, the level of competition faced by each competitive business may be quantified with the probability that any representative competitive to that business is within a predetermined distance from any of its representatives. Still further quantitative analyses may be derived using other techniques known to those of skill in the art.

The information resulting from any of these analytical techniques may be used to devise competitive strategies. For example, the information may reveal that some areas face so little competition that it would be useful to add a business representative near a specific location. In some instances, a competitive strategy may be devised in which new business representatives are deliberately added even knowing that they are likely to cannibalize business from existing business representatives. Such a strategy may nevertheless be advantageous if the resulting new distribution of business representatives will collectively acquire an overall larger market share in that geographic region.

Alternatively, the location information for each of the representatives may be correlated with demographic information at block 116. In one embodiment, the demographic information is obtained from census information. Typically, the census information is organized differently from postal-code information so that a mapping may be performed to identify individual locator identifications with demographic regions. For example, in the United States, the demographic information is organized hierarchically by state, county, census track, and block group. A census track typically covers about 1000 households and a block group generally covers a population of about 1000–1200 individuals. Correlation of representative location with the demographic data is achieved by the locator identifications with the demographic region (e.g., census track or block group) that includes them.

Market penetration within specific geographic areas is determined at block 120 by comparing the number of business representatives and competitor representatives with the expected volume of customers based on the demographics of the area. For example, by applying the demographic factors that characterize a typical customer of the business product to the demographic distribution of the area, the total number of potential customers is derived. This number may, in different embodiments that sometimes depend on the type of business product, be correlated with the daytime or evening number of individuals present in the area; some products are more likely to attract customers who live in the area while other products are more likely to attract customers who work in the area. Correlation with the demographic information may also be performed by accounting for differences in service levels for the representatives of interest. This may be manifested by a variation in the choice of application of certain demographic factors.

At block 124, a graphical representation of derived market-intelligence information may be generated and displayed. An example of a map-based graphical representation is provided in FIG. 3 for a geographical region 300. In this example, two competitors are considered. The symbol "x" is used to mark the location of business representatives and circles and squares are used to mark competitor-representative locations for each of the two competitors respectively. The geographical region 300 is divided into a plurality of distinct areas 304; in one embodiment the distinct areas are census tracks and in another embodiment the distinct areas are block groups. The areas 304 are shaded differently to illustrate graphically the results of correlating representative locations with demographic information, and thereby show the result of applying a filter criterion based on demographic distributions. After comparing (1) the expected customer volume for each area as determined from the demographic information with (2) the total representative density within each area, the filter criterion acts to classify areas 304 according to market penetration. The lack of hatching in areas 304-1, 304-2, and 304-5 is used to designate them as having low market penetration; the sparse hatching in areas 304-3, 304-4, 304-6, 304-8, and 304-10 is used to designate them as having intermediate market penetration; and the dense hatching in areas 304-7 and 304-9 is used to designate them as having high market penetration. An initial conclusion to be drawn from this geographic information is that areas having low market penetration are fertile areas for introducing new representatives while areas having high market penetration are generally those for which the introduction of new representatives is likely to prove counterproductive. While the areas are distinguished in FIG. 3 with shading, they will more usually be distinguished by using different colors.

There are several features regarding the exemplary distribution that are noted. One feature is that in some instances, such as shown in area 304-8, a business representative and a competitor representative may be identified with the same rooftop locator, thereby appearing on the map at the same location. Such a feature may indicate that an representative has entered into business relationships with more than one provider, likely in violation of a contractual agreement or even in violation of a state licensing agreement. This market intelligence can be used to remedy the likely contractual breach with the particular representative.

Another feature, such as shown in area 304-9, is a locally high density of business representatives. One conclusion that may be drawn is that area 304-9 has such a large number of representatives that they are cannibalizing business from each other. Unless a strategic decision has been made to permit such cannibalization to deprive competitor representatives of business, a reduction of the number of business representatives in that area may be indicated.

A further feature, such as shown in area 304-2, is a very limited number of business representatives and no competitor representatives in a certain region. Such a feature generally indicates that the area is fertile for introducing additional business representatives.

A similar feature exists in areas 304-1 and 304-5, except that those regions have no representatives at all. While it is possible that those areas are highly fertile, it is also possible that one or more of them is subject to an external constraint preventing the introduction of representatives. For example, area 304-5, while having no representatives present, is shaded to show that the demographic analysis has determined it to be an infertile area. These facts may be reconciled with the conclusion that area 304-5 is demographically unsuitable for the products—the number of individuals who meet the expected criteria is so small that no representatives are needed.

By contrast, area 304-1 is demographically fertile, but also has no representatives present. This may represent a previous failure to recognize the potential demand in that area, or may represent a demographic shift that has caused a recent increase in demand; either circumstance may be remedied by adding business representatives within the area. In some instances, however, it may not be possible to provide representatives in the area because it is zoned purely for residential purposes or has some other restriction. In such cases, it is desirable to group areas for demographic analysis since the addition or removal of representatives from neighboring areas may be warranted to accommodate the area with the restriction. For example, areas 304-1, 304-2, 304-3, 304-4, 304-5, and 304-6 may be grouped into a larger locality and analyzed demographically in the same fashion as the smaller areas 304. Specifically, demographic indicators within the census or other demographic survey are used to define a population size believed likely to use the products and this is compared with the number of representatives currently within the locality. In the specific example shown in FIG. 3, it may thus be appropriate to add business representatives in areas 304-2 and 304-5, particularly near the border with area 304-1, even if there is no specific demand within area 304-5 itself.

The information provided may also be used in making decisions about future products that may be offered. For example, if a new product is to be introduced in a market saturated with representatives, the information derived above may be used to determine which of those representatives is most suitable for the new product.

The above discussion sets forth various illustrative conclusions that may be drawn for an example of market intelligence derived in accordance with the invention. This specific example and these specific conclusions are not intended to limit the scope of the invention. Other examples of market intelligence that may be derived with the methods and systems of the invention and other specific conclusions that may be derived from that market intelligence will be apparent to those of skill in the art after reading the foregoing description. While comments have generally been made regarding changing the number of representatives within certain areas, some situations may be addressed by changing service levels of existing representatives.

Figure 3:
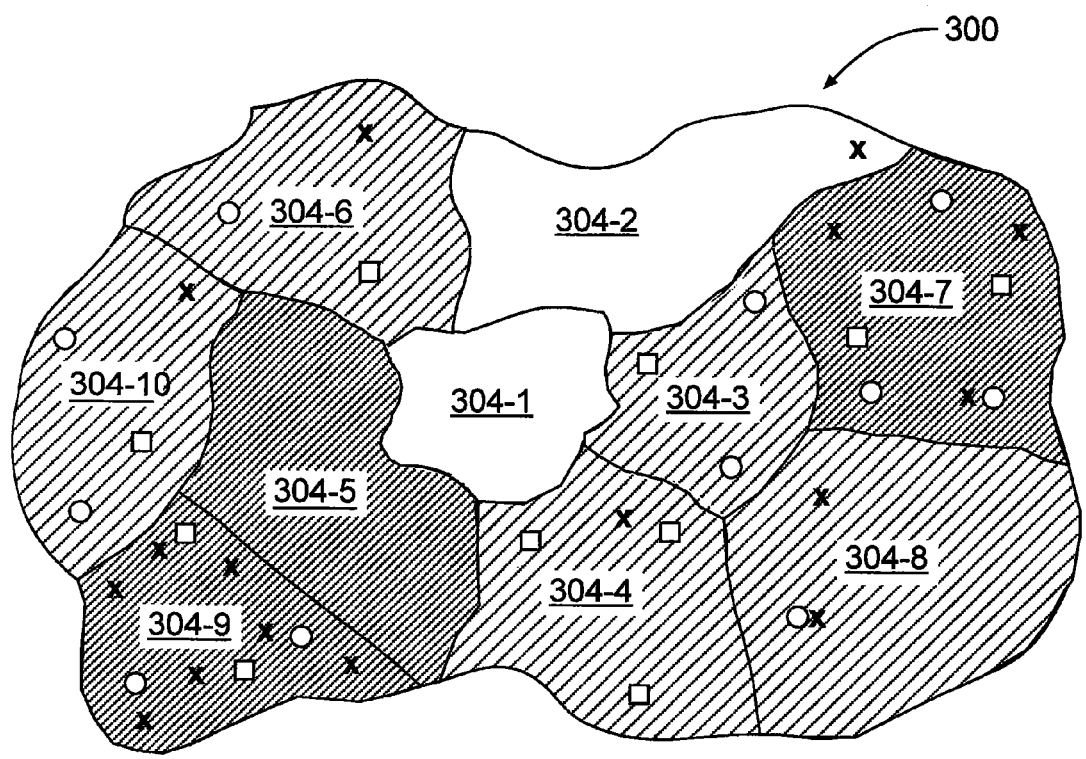
FIG. 3 is a map illustrating the assignment of different saturation levels to different geographic regions in accordance with an embodiment.

Graphical map representations such as the one illustrated in FIG. 3 may be configured to be interactive and provided to business representatives. In one embodiment, the graphical map representations are provided on hand-held devices, accommodating the frequent travel of such representatives within assigned areas. This interactivity is a convenient method for providing additional information to business representatives that may be used in developing strategies for representative distributions and functions. Typically, the interactivity is supported with data downloaded from the business-representative and/or competitor-representative databases, either batched periodically or in real time. In one embodiment, the demographic information for each of the areas 304 is made available interactively, and is called up, for example, by clicking on the relevant map region. The demographic information subsequently called up specifies relevant characteristics for that area, such as distributions by age, sex, income, education, type of employment, etc. Such distributions may be provided in textual or graphical form, such as in the form of pie charts. This specific demographic information is sometimes of more use to the business representative in formulating market strategies than is the application of the broader filter criterion; the availability of both the broader and more detailed information gives the business representative flexibility to use whichever information is more useful for a particular application.

In another embodiment, information regarding each of the business representatives and/or competitive representatives is displayed interactively. For example, by clicking on the symbol for one of the business-representative locations, information regarding that representative is provided from the business-representative database. The information displayed may include publicly available information such as full address, products and/or services offered, and hours of operation. Since that database also includes confidential information, the details provided to the business representative may be even more comprehensive, including such additional specifics as the volume of business handled by the representative, its net profitability, etc. Similar information regarding the competitor representatives may be obtained by clicking on the symbol for one of the competitor-representative locations. The information provided to the business representative is derived from the competitor-representative database(s) and is therefore derived from publicly obtained information, such as full address, types of products and/or services provided, hours of operation, etc.

Figure 4A:
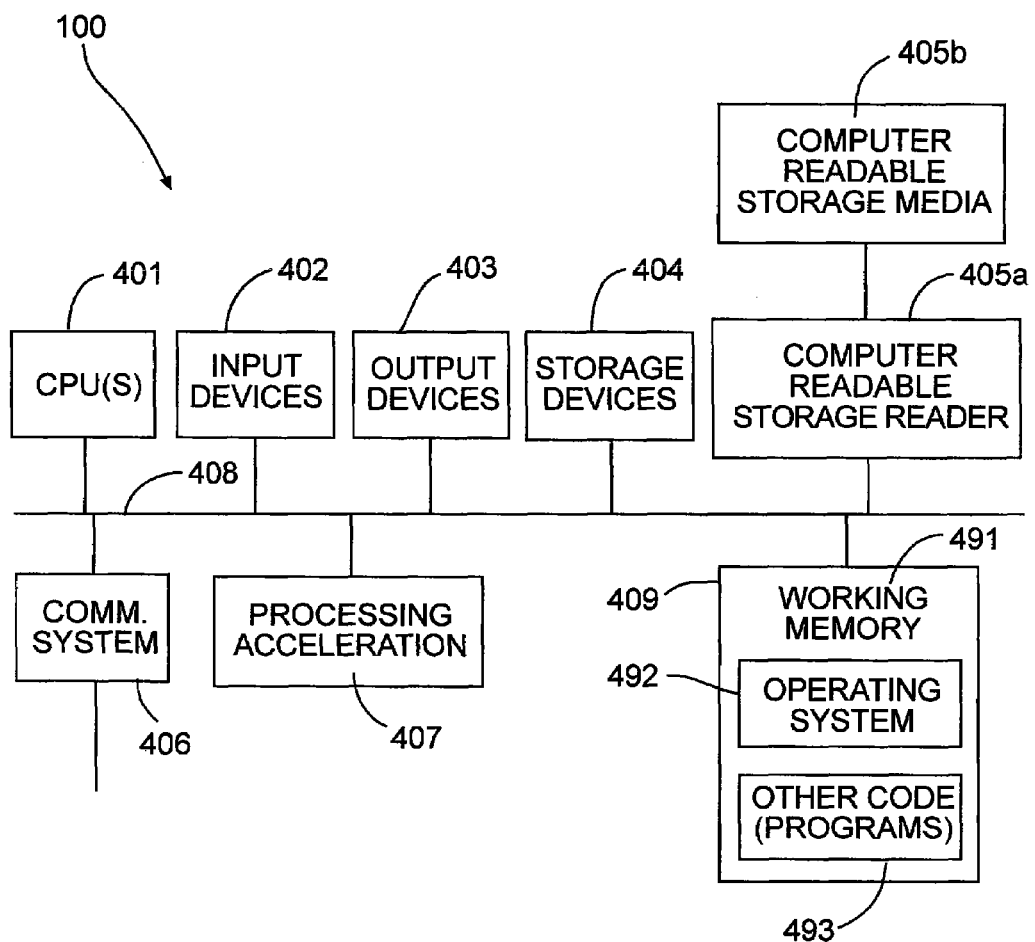
FIGS. 4A and 4B provide schematic illustrations of a computer system on which methods of the invention may be embodied.

The methods of the invention may be performed by a computer, one example of a suitable configuration for which is shown in FIG. 4A. This figure broadly illustrates how individual system elements may be implemented in a separated or more integrated manner. The computer 400 is shown comprised of hardware elements that are electrically coupled via bus 408, including a processor 401, an input device 402, an output device 403, a storage device 404, a computer-readable storage media reader 405a, a communications system 406, a processing acceleration unit 407 such as a DSP or special-purpose processor, and a memory 409. The computer-readable storage media reader 405a is further connected to a computer-readable storage medium 405b, the combination comprehensively representing remote, local, fixed, and/or removable storage devices plus storage media for temporarily and/or more permanently containing computer-readable information. The business-representative and competitor-representative databases are generally stored on the storage device 404. For embodiments in which data are extracted from web sites, the communications system 406 provides a connection with the internet and may comprise a wired, wireless, modem, and/or other type of interfacing connection. Also, for embodiments in which data from the business-representative and competitor-representative databases are downloaded to remote sites for use by business representatives, the communications system 406 provides a connection to such remote sites.

The computer 400 also comprises software elements, shown as being currently located within working memory 491, including an operating system 492 and other code 493, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

Figure 4B:
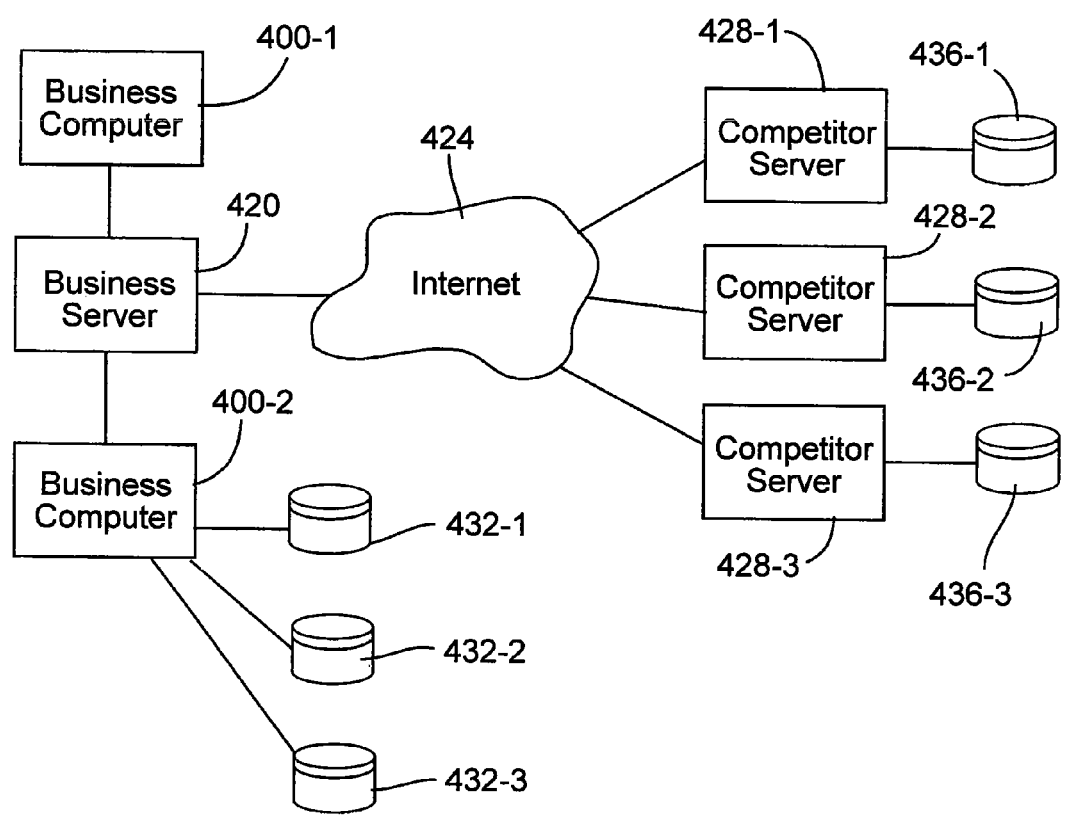

FIG. 4B provides a schematic illustration of how the computer 400 may be integrated into a system connected with the internet 424 to perform the methods of the invention. In the embodiment shown, two business computers 400 are used, a first 400-1 that is programmed to search for competitor representative information and a second 400-2 that is programmed to maintain the business-representative and competitor-representative databases 432. In another embodiment, a single business computer performs all such functions. The business computer(s) 400 are connected to the internet 424 through business server 420. The internet 424 is also connected with a plurality of competitor servers 428, each of which provides access to competitor databases 436.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for characterizing market distribution of a business, the method comprising:

determining a location of each of a plurality of business representatives comprised by the business and situated at different geographical locations to provide sales of the business's products;

determining a location of each of a plurality of competitor representatives comprised by one or more competitors and situated at different geographical locations to provide sales of competitor products, wherein each of the one or more competitors competes for sales of products with the business;

populating at least one database with the locations of the business representatives and the locations of the competitor representatives;

from location information in the at least one populated database, calculating a probability that quantifies a level of competition to the business for sales of the business's products, the competition being provided by the one or more competitors providing sales of the competitor products, and the level of competition being quantified in terms of a distance measure between the business and competitor representatives;

correlating the quantified level of competition with demographic data corresponding to the location information in the at least one populated database; and outputting the quantified level of competition.

2. The method recited in claim 1 wherein determining the location of each of the plurality of competitor representatives comprises accessing an representative locator service on an internet web site of the one or more competitors.

3. The method recited in claim 2 wherein accessing the representative-locator service is performed automatically by a web robot.

4. The method recited in claim 1 wherein determining the location for each of the plurality of competitor representatives comprises accessing an authenticated source identifying transactions performed by the competitor representatives.

5. The method recited in claim 4 wherein the authenticated source comprises a publicly available government record.

6. The method recited in claim 1 wherein the demographic data comprise census data.

7. The method recited in claim 1 further comprising applying a filter criterion to the correlated data to characterize geographic divisions within the demographic data by market penetration.

8. The method recited in claim 7 further comprising displaying the locations graphically according to the geographic divisions, wherein the geographic divisions are distinctly displayed according to the filter criterion.

9. The method recited in claim 1 further comprising displaying the locations graphically.

10. The method recited in claim 9 wherein displaying the locations graphically comprises displaying the locations on a map.

11. The method recited in claim 9, wherein the at least one database includes product information of the business representatives and of the competitor representatives, the method further comprising displaying the product information of at least one of the locations.

12. The method recited in claim 1, wherein calculating the probability that quantifies the level of competition comprises calculating a probability that at least one of the competitor representatives exists within a predetermined distance of each business representative.

13. The method recited in claim 1, wherein calculating the probability that quantifies the level of competition comprises calculating a probability that at least one of the business representatives exists within a predetermined distance of each competitor representative.

14. The method recited in claim 1, wherein calculating the probability that quantifies the level of competition comprises calculating a probability that any of the competitor representatives exists within a predetermined distance of any of the business representatives.

15. A computer system comprising:
a communications system;
a storage device;
a processor in communication with the communications system and the storage device; and
a memory coupled with the processor, the memory comprising a computer readable storage medium having a computer-readable program embodied therein to operate the computer system to characterize market distribution of a business, the computer-readable program including:
instructions to maintain at least one database on the storage device to store a location of each of a plurality of business representatives comprised by the business and situated at different geographical locations to provide sales of the business's products, and to store a location of each of a plurality of competitor representatives comprised by one or more competitors and situated at different geographical locations to provide sales of competitor products, wherein each of the one or more competitors competes for sales of products with the business;
instructions to calculate, from location information in the at least one database, a probability that quantifies a level of competition to the business for sales of the business's products, the competition being provided by the one or more competitors providing sales of the competitor products, and the level of competition being quantified in terms of a distance measure between the business and competitor representatives; and
instructions to correlate the quantified level of competition with demographic data corresponding to the location information in the at least one database.

16. The computer system recited in claim 15 wherein the computer readable program further includes instructions to determine the location of each of the plurality of competitor representatives by accessing an representative-locator service with the communications system on an internet web site of the one or more competitors.

17. The computer system recited in claim 15 wherein the computer-readable program further includes instructions to operate the processor to apply a filter criterion to the correlated data to characterize geographic divisions within the demographic data by market penetration.

18. The computer system recited in claim 15 wherein the memory further comprises a second computer-readable storage medium having a second computer readable program embodied therein to operate the computer system to populate the at least one database, the second computer-readable program including:
instructions to access a representative-locator service maintained by the one or more competitors at an internet web site;
instructions to extract location information for the plurality of competitor representatives from the representative-locator service; and
instructions to store the location information in the at least one database.

19. The computer system recited in claim 15, wherein instructions to calculate the probability that quantifies the level of competition comprise instructions to calculate a probability that at least one of the competitor representatives exists within a predetermined distance of each business representative.

20. The computer system recited in claim 15, wherein the instructions to calculate the probability that quantifies the level of competition comprise instructions to calculate a probability that at least one of the business representatives exists within a predetermined distance of each competitor representative.

21. The computer system recited in claim 15, wherein the instructions to calculate the probability that quantifies the level of competition comprise instructions to calculate a probability that any of the competitor representatives exists within a predetermined distance of any of the business representatives.

22. A computer-readable storage medium having a computer-readable program embodied therein to direct operation of a computer system including a communications system, a processor, and a storage device, wherein the computer readable program includes instructions to operate the computer system to characterize market distribution of a business in accordance with the following:
maintaining at least one database on the storage device to store a location of each of a plurality of business representatives comprised by the business and situated at different geographical locations to provide sales of the business's products, and to store a location of each of a plurality of competitor representatives comprised by one or more competitors and situated at different geographical locations to provide sales of competitor products, wherein each of the one or more competitors competes for sales of products with the business;
from location information in the at least one database, calculating a probability with the processor that quantifies a level of competition to the business for sales of the business's products, the competition being provided by the one or more competitors providing sales of the competitor products, and the level of competition being quantified in terms of a distance measure between the business and competitor representatives;
correlating, with the processor, the quantified level of competition with demographic data corresponding to the location information in the at least one database; and
outputting the quantified level of competition.

23. The computer-readable storage medium recited in claim 22 wherein the computer-readable program further includes instructions to determine the location of each of the plurality of competitor representatives by accessing an representative-locator service with the communications system on an internet web sited of the one or more competitors.

24. The computer-readable storage medium as recited in claim 22 wherein the computer-readable program further includes instructions to determine the location of each of the plurality of competitor representatives by accessing a publicly available source identifying transactions performed by the competitor representatives.

25. The computer-readable storage medium recited in claim 22 wherein the computer-readable program further includes instructions to operate the processor to apply a filter criterion to the correlated data to characterize geographic divisions within the demographic data by market penetration.

26. The computer-readable storage medium recited in claim 25 wherein the computer-readable program further includes instructions to:

generating a graphical representation of the locations according to the geographic divisions, the graphical representation including a distinction among the geographic divisions according to the filter criterion; and transmitting the graphical representation over the communication system.

27. The computer-readable storage medium recited in claim 22, wherein the instructions to calculate the probability that quantifies the level of competition comprise instructions to calculate a probability that at least one of the competitor representatives exists within a predetermined distance of each business representative.

28. The computer-readable storage medium recited in claim 22, wherein the instructions to calculate the probability that quantifies the level of competition comprise instructions to calculate a probability that at least one of the business representatives exists within a predetermined distance of each competitor representative.

29. The computer-readable storage medium recited in claim 22, wherein the instructions to calculate the probability that quantifies the level of competition comprise instructions to calculate a probability that any of the competitor representatives exists within a predetermined distance of any of the business representatives.

* * * * *